United States Patent
Hong et al.

(10) Patent No.: US 10,560,849 B2
(45) Date of Patent: Feb. 11, 2020

(54) CELL CLUSTERING BASED CONFIGURATION OF FLEXIBLE TIME DIVISION DUPLEX COMMUNICATION

(71) Applicant: AVAGO TECHNOLOGIES INTERNATIONAL SALES PTE. LIMITED

(72) Inventors: Wei Hong, Beijing (CN); Jing Han, Beijing (CN); Lili Zhang, Beijing (CN); Haiming Wang, Beijing (CN); Chunyan Gao, Beijing (CN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/944,245

(22) Filed: Apr. 3, 2018

(65) Prior Publication Data

US 2018/0227766 A1    Aug. 9, 2018

Related U.S. Application Data

(63) Continuation of application No. 14/761,508, filed as application No. PCT/CN2013/070660 on Jan. 18, 2013, now Pat. No. 9,973,934.

(51) Int. Cl.
*H04W 16/10* (2009.01)
*H04W 72/04* (2009.01)
(Continued)

(52) U.S. Cl.
CPC ............. *H04W 16/10* (2013.01); *H04L 5/001* (2013.01); *H04W 72/0406* (2013.01);
(Continued)

(58) Field of Classification Search
CPC ............. H04W 16/10; H04W 72/0446; H04W 84/045
(Continued)

(56) References Cited

U.S. PATENT DOCUMENTS

2012/0099505 A1    4/2012   Wang et al.
2013/0194982 A1*   8/2013   Fwu ........................ H04W 4/70
                                                             370/280
(Continued)

FOREIGN PATENT DOCUMENTS

| CN | 101646257 | 2/2010 |
| CN | 101873722 | 10/2010 |
| WO | 2012/119309 | 9/2012 |

OTHER PUBLICATIONS

International Search Report issued in PCT/CN2013/070660 dated Oct. 31, 2013.
(Continued)

*Primary Examiner* — Jae Y Lee
*Assistant Examiner* — Jean F Voltaire
(74) *Attorney, Agent, or Firm* — Xsensus LLP

(57) ABSTRACT

There are provided measures for cell clustering based configuration of flexible time division duplex communication, such as e.g. in layered heterogeneous network deployments. Such measures may exemplarily comprise measures for specifying a desired uplink-downlink configuration for time division duplex communication in a subject cell of a cellular communication system, obtaining at least one desired uplink-downlink configuration for time division duplex communication in at least one neighboring cell of the cellular communication system, wherein the at least one neighboring cell and the subject cell belong to the same cell cluster, and defining an uplink-downlink configuration for time division duplex communication in at least the subject cell of the cell cluster out of a set of predefined uplink-downlink configurations with flexible subframe patterns for
(Continued)

flexible time division duplex communication on the basis of the specified desired uplink-downlink configuration for the subject cell and the obtained at least one desired uplink-downlink configuration for the at least one neighboring cell.

20 Claims, 9 Drawing Sheets

(51) Int. Cl.
    *H04W 88/08*      (2009.01)
    *H04L 5/00*      (2006.01)
    *H04W 74/00*      (2009.01)
    *H04B 7/26*      (2006.01)
    *H04W 36/30*      (2009.01)
    *H04L 5/14*      (2006.01)
    *H04W 24/02*      (2009.01)
    *H04W 84/04*      (2009.01)

(52) U.S. Cl.
    CPC ..... *H04W 72/0446* (2013.01); *H04W 74/006* (2013.01); *H04W 88/08* (2013.01); *H04B 7/2643* (2013.01); *H04B 7/2656* (2013.01); *H04L 5/0089* (2013.01); *H04L 5/14* (2013.01); *H04W 24/02* (2013.01); *H04W 36/30* (2013.01); *H04W 84/045* (2013.01)

(58) Field of Classification Search
    USPC .......................................................... 370/254
    See application file for complete search history.

(56) References Cited

U.S. PATENT DOCUMENTS

2013/0294296 A1* 11/2013 Dimou ................ H04W 72/082
    370/280
2014/0022966 A1* 1/2014 Parkvall ............... H04B 7/2656
    370/280
2015/0282036 A1* 10/2015 Yi ........................... H04L 5/001
    370/332

OTHER PUBLICATIONS

Office Action issued in corresponding European Application No. 13871487.8 dated Sep. 2, 2016 (4 pages).
INTEL CORPORATION: "Evaluation of Macro-Pico co-channel scenario for the case of dynamic UL-DL reconfiguration on the Pico nodes", 3GPP DRAFT; R1-122646, 3$^{rd}$ Generation Partnership Project (3GPP), Mobile Competence Centre; Prague, Czech Republic, 21$^{st}$-25$^{th}$ May, 2012.

* cited by examiner

CELL CLUSTERING BASED CONFIGURATION OF FLEXIBLE TIME DIVISION DUPLEX COMMUNICATION

CROSS-REFERENCE TO RELATED APPLICATIONS

This application is a continuation of U.S. application Ser. No. 14/761,508, filed Jul. 16, 2015, which is a U.S. national stage application of International Application No. PCT/CN2013/070660, filed Jan. 18, 2013, the entire contents of which are incorporated herein by reference.

FIELD

The present invention relates to cell clustering based configuration of flexible time division duplex communication. More specifically, the present invention relates to measures (including methods, apparatuses and computer program products) for realizing cell clustering based configuration of flexible time division duplex communication, such as e.g. in layered heterogeneous network deployments.

BACKGROUND

In the field of communication systems, including wireless and/or cellular communication systems, various techniques are known for concurrently utilizing a physical channel for both transmitting and receiving operations, i.e. for communication in both transmitting and receiving directions from the viewpoint of a system entity in questions. One of these known channel utilization techniques is Time Division Duplex (TDD) in which transmitting and receiving operations utilize a common frequency spectrum while being temporally separated from each other.

The TDD technique is effective by offering flexible deployments without requiring a pair of spectrum resources, which is especially beneficial in wireless communication systems having limited spectrum resources. Further, the TDD technique is effective by allowing asymmetric uplink-downlink (UL-DL) resource allocations in that a different number of resources (e.g. blocks, frames, subframes or the like) are allocated for uplink and downlink communications. In view of these features, TDD is currently utilized in various communication systems, including wireless and/or cellular communication systems, e.g. LTE and LTE-A systems.

In current LTE/LTE-A deployments, the same TDD (UL-DL) configuration in each cell is assumed, since otherwise interference between UL and DL, including both base station-to-base station (e.g. eNB-to-eNB) interference and terminal-to-terminal (e.g. UE-to-UE) interference, arises and needs to be considered especially in neighboring cells. However, adopting the same UL-DL configuration in each cell is typically inadequate in cellular communication systems. This is because different traffic situations in different (including neighboring) cells could most appropriately be handled by different UL-DL configurations, i.e. a differently distributed allocation of the available resources to UL and DL communications. For example, in local area (LA) networks, due to a small number of active UEs per cell, the traffic situation may fluctuate frequently, and flexible TDD re-/configuration to adapt to the traffic (i.e. traffic adaptation) could be expected to provide improved resource efficiency and provide power saving. Namely, since in LA networks the typical cell size is small in comparison with a typical (macro) cell and the number of terminals connected to each base station in the network is not large, there is an increased possibility that the traffic situation in different LA cells may only be adequately handled by different UL-DL configurations.

Accordingly, in case TDD configurations are set adaptively in different cells e.g. corresponding to the traffic (fluctuation) status therein, a new type of interference between such cells could be introduced as compared with the scenarios without such flexible TDD configuration, i.e. DL-UL interference and UL-DL interference, generally referred to as inter-cell cross-link interference herein. For example, when neighboring cells perform traffic adaptation by selecting UL-DL configurations in which at least one (flexible) subframe is assigned for different link directions, such inter-cell cross-link interference could occur for this at least one subframe.

The above considerations generally hold for all kinds of cellular communication systems, but may be particularly relevant in layered heterogeneous network (HetNet) deployments in which macro (high power) and micro, pico or femto (low power) cells are deployed in different logical layers in parallel. Accordingly, such inter-cell cross-link interference could equally occur between macro cells and between a macro cell and a micro, pico or femto cell.

As one measure for inter-cell interference mitigation in the context of enhancements to interference management and traffic adaptation (eIMTA) for LTE TDD, a cell clustering interference mitigation (CCIM) scheme has been proposed.

In the CCIM scheme, cell clusters are formed, wherein each cell cluster can comprise one or more cells, typically micro, pico or femto cells in a layered heterogeneous network deployment. The active transmissions of all cells in each cell cluster shall be either uplink or downlink in any subframe or a subset of all subframes, so that eNB-to-eNB interference and UE-to-UE interference can be mitigated within the cell cluster. Hence, in order to enable a TDD subframe re-/configuration satisfying the above requirement on active transmissions of all cells in the same cluster, coordination between the multiple cells belonging to the same cell cluster is needed.

However, no measures are currently known or specified for realizing such needed coordination between the multiple cells belonging to the same cell cluster for enable a TDD subframe re-/configuration satisfying the above requirement on active transmissions of all cells in the same cluster. Stated in other words, no measures are currently known or specified, which would be applicable to enable a re-/configuration of flexible TDD communication within a cell cluster so as to facilitate inter-cell interference mitigation, especially cell clustering interference mitigation, in cellular communication systems such as e.g. in layered heterogeneous network deployments.

Thus, there is a need to provide measures to enable cell clustering based configuration of flexible TDD communication, such as e.g. in layered heterogeneous network deployments

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising specifying a desired uplink-downlink configuration for time division duplex communication in a subject cell of a cellular communication system, obtaining at least one desired uplink-downlink configuration for time division duplex communication in at least one neighboring cell of the cellular communication system, wherein the at least one neighboring cell and the subject cell belong to the same cell cluster, and defining an uplink-downlink configuration for time division duplex communication for at least the subject cell of the cell cluster out of a set of predefined uplink-downlink configurations with flexible subframe patterns for flexible time division duplex communication on the basis of the specified desired uplink-downlink configuration for the subject cell and the obtained at least one desired uplink-downlink configuration for the at least one neighboring cell.

According to an exemplary aspect of the present invention, there is provided a method comprising setting a configuration mode for defining an uplink-downlink configuration for time division duplex communication out of a set of predefined uplink-downlink configurations with flexible subframe patterns for flexible time division duplex communication for at least one cell of a cell cluster on the basis of a desired uplink-downlink configuration for a subject cell and at least one desired uplink-downlink configuration for at least one neighboring cell, wherein the at least one neighboring cell and the subject cell belong to the same cell cluster, and issuing an indication of the set configuration mode to all cells of the cell cluster, which indicates one of a first configuration mode in which the same uplink-downlink configuration is required for the cell cluster and a second configuration mode in which different uplink-downlink configurations within the same subset of the set of predefined uplink-downlink configurations are allowed for the cell cluster.

According to an exemplary aspect of the present invention, there is provided an apparatus comprising at least one processor, and at least one memory including computer program code, the at least one processor, with the at least one memory and the computer program code, being configured to cause the apparatus to perform: specifying a desired uplink-downlink configuration for time division duplex communication in a subject cell of a cellular communication system, obtaining at least one desired uplink-downlink configuration for time division duplex communication in at least one neighboring cell of the cellular communication system, wherein the at least one neighboring cell and the subject cell belong to the same cell cluster, and defining an uplink-downlink configuration for time division duplex communication for at least the subject cell of the cell cluster out of a set of predefined uplink-downlink configurations with flexible subframe patterns for flexible time division duplex communication on the basis of the specified desired uplink-downlink configuration for the subject cell and the obtained at least one desired uplink-downlink configuration for the at least one neighboring cell.

According to an exemplary aspect of the present invention, there is provided an apparatus comprising at least one processor, and at least one memory including computer program code, the at least one processor, with the at least one memory and the computer program code, being configured to cause the apparatus to perform: setting a configuration mode for defining an uplink-downlink configuration for time division duplex communication out of a set of predefined uplink-downlink configurations with flexible subframe patterns for flexible time division duplex communication for at least one cell of a cell cluster on the basis of a desired uplink-downlink configuration for a subject cell and at least one desired uplink-downlink configuration for at least one neighboring cell, wherein the at least one neighboring cell and the subject cell belong to the same cell cluster, and issuing an indication of the set configuration mode to all cells of the cell cluster, which indicates one of a first configuration mode in which the same uplink-downlink configuration is required for the cell cluster and a second configuration mode in which different uplink-downlink configurations within the same subset of the set of predefined uplink-downlink configurations are allowed for the cell cluster.

According to an exemplary aspect of the present invention, there is provided an apparatus comprising means for specifying a desired uplink-downlink configuration for time division duplex communication in a subject cell of a cellular communication system, means for obtaining at least one desired uplink-downlink configuration for time division duplex communication in at least one neighboring cell of the cellular communication system, wherein the at least one neighboring cell and the subject cell belong to the same cell cluster, and means for defining an uplink-downlink configuration for time division duplex communication for at least the subject cell of the cell cluster out of a set of predefined uplink-downlink configurations with flexible subframe patterns for flexible time division duplex communication on the basis of the specified desired uplink-downlink configuration for the subject cell and the obtained at least one desired uplink-downlink configuration for the at least one neighboring cell.

According to an exemplary aspect of the present invention, there is provided an apparatus comprising means for setting a configuration mode for defining an uplink-downlink configuration for time division duplex communication out of a set of predefined uplink-downlink configurations with flexible subframe patterns for flexible time division duplex communication for at least one cell of a cell cluster on the basis of a desired uplink-downlink configuration for a subject cell and at least one desired uplink-downlink configuration for at least one neighboring cell, wherein the at least one neighboring cell and the subject cell belong to the same cell cluster, and means for issuing an indication of the set configuration mode to all cells of the cell cluster, which indicates one of a first configuration mode in which the same uplink-downlink configuration is required for the cell cluster and a second configuration mode in which different uplink-downlink configurations within the same subset of the set of predefined uplink-downlink configurations are allowed for the cell cluster.

According to an exemplary aspect of the present invention, there is provided a computer program product comprising a set of instructions (e.g. computer-executable computer program code) which, when executed on an apparatus or a computer of an apparatus (e.g. an apparatus according to any one of the aforementioned apparatus-related exemplary aspects of the present invention), is arranged/configured to cause the computer or apparatus to carry out the method according to any one of the aforementioned method-related exemplary aspect of the present invention.

Such computer program product may for example comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following.

By virtue of the aforementioned exemplary aspects of the present invention, there is enabled cell clustering based configuration of flexible TDD communication.

Thereby, the usage of an appropriate TDD UL-DL configuration in the entire cell cluster or in each cell of the cell cluster can be coordinated in flexible TDD re-/configuration, thereby ensuring that active transmissions of all cells in the cell cluster are either uplink or downlink in any subframe or a subset of all subframes.

Thus, enhancements are achieved by methods, apparatuses and computer program products enabling/realizing cell clustering based configuration of flexible TDD communication. Such enhancements generally contribute to enhancements to interference management and traffic adaptation (eIMTA) e.g. for LTE/LTE-A TDD.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Figure 1:
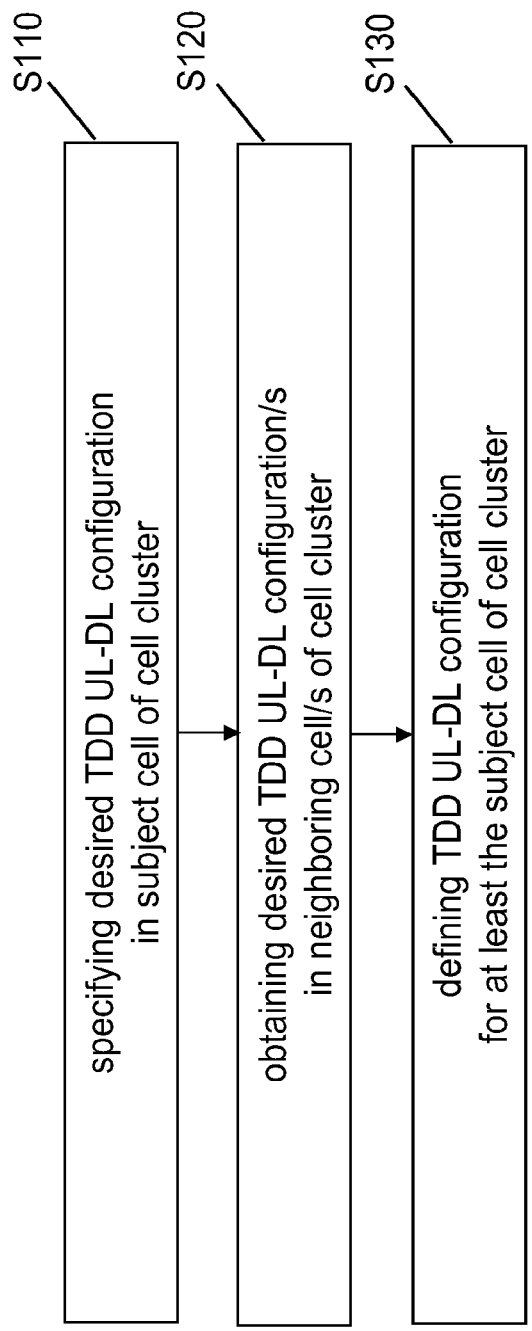
FIG. 1 shows a flowchart illustrating an example of a procedure for a cell clustering based configuration of a flexible TDD communication according to some embodiments of the present invention.

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, for explaining applicability of thus described exemplary embodiments in an illustrative manner, a LTE/LTE-A system is used as a non-limiting example of a cellular communication system. As such, the description of exemplary embodiments given herein specifically refers to terminology which is directly related thereto. Such terminology is only used in the context of the presented non-limiting examples, and does naturally not limit the invention in any way.

Rather, any other network configuration or system deployment, etc. may also be utilized as long as compliant with the features described herein.

In particular, the present invention and its embodiments may be applicable in any cellular communication system (of homogeneous or heterogeneous deployment type) in which flexible TDD communication is applicable within a cell cluster. More specifically, the present invention and its embodiments are generally applicable to enhancements to interference management and traffic adaptation (eIMTA) in such systems.

According to exemplary embodiments of the present invention, in general terms, there are provided mechanisms, measures and means for cell clustering based configuration of flexible TDD communication.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives). Some embodiments of the present invention are described with reference to methods, procedures and functions, as well as with reference to structural arrangements and configurations.

In the context of LTE/LTE-A TDD systems, seven different semi-statically configured (TDD) UL-DL configurations (which could also be referred to as TDD configurations or configuration frames or frame configurations) are specified for realizing an asymmetric resource allocation. The resource allocations, which may be realized by these specified (TDD) UL-DL configurations, provide between 40% and 90% of DL subframes, i.e. DL capacity. In the following table, these specified (TDD) UL-DL configurations are shown, wherein D indicates a DL subframe, U indicates an UL subframe, and S indicates a special subframe.

| Uplink-downlink configuration | Downlink-to-Uplink switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the present specification, those subframes (like subframes 0, 1, 2 and 5) having a fixed link direction are referred to as fixed subframe, while those subframes having a variable link direction are referred to as flexible subframe.

While subframes 0, 1, 2 and 5 are always fixed subframes in any arrangement, the fixed and flexible subframes can change depending on which ones of the (TDD) UL-DL configurations are (allowed to be) adopted, e.g. by the cells of a cell cluster. For example, if a network only supports (TDD) UL-DL configurations 1 and 2, then subframes 0, 1, 2, 4, 5, 6, 7, 9 are all fixed subframes, while subframes 3 and 8 are flexible subframes which are set as UL in configuration 1 and as DL in configuration 2.

Accordingly, depending on which (TDD) UL-DL configurations are (allowed to be) adopted by the cells of a cell cluster, the aforementioned requirement that the active transmissions of all cells in each cell cluster shall be either uplink or downlink in any subframe or a subset of all subframes might be corrupted, thus resulting in inter-cell interference including any one of single-link and cross-link type interference.

In the following, embodiments of the present invention are described by way of example with reference to an exemplary deployment scenario (see e.g. FIGS. 5 and 7). In the exemplary deployment scenario, a layered heterogeneous network (HetNet) deployment is adopted, in which a macro (high power) cell of a higher or superordinate (logical) layer is associated with a set of micro, pico or femto (low power) cells of a lower or subordinate (logical) layer. In the illustrated example, a number of subordinate or lower layer cells constitute a cell cluster. In this case, the base station of a superordinate cell, denoted as macro eNB, cooperates with any one of the base stations of the subordinate cells of the cell cluster, referred to as pico eNBs, and the base stations of the subordinate cells of the cell cluster cooperate with each other. However, it is also possible that the superordinate or higher layer cell as well as a number of subordinate or lower layer cells constitute a cell cluster. In this case, the base station of the superordinate cell, denoted as macro eNB, as well as any one of the base stations of the subordinate cells, referred to as pico eNBs, cooperate with each other within such cell cluster. In an LTE/LTE-A network deployment, a signaling communication between each pair of base stations could be accomplished via an X2 interface, especially as a radio network layer signaling of the control plane in the framework of an X2 application protocol.

In view of the above, while the following description is based on an exemplary deployment scenario of a layered heterogeneous network deployment, in which a cell cluster is formed by a number of small (i.e. micro, pico or femto) cells only, the principles set out herein equally apply to a deployment scenario of a layered heterogeneous network deployment, in which a cell cluster is formed by at least one large (e.g. macro) cell in addition to a number of small (i.e. micro, pico or femto) cells, wherein in such case the base station of the at least one large cell preferably serves/controls the base stations of the number of small cells.

FIG. 1 shows a flowchart illustrating an example of a procedure for a cell clustering based configuration of a flexible TDD communication according to some embodiments of the present invention. The thus illustrated example procedure may be implemented at or by any one of the cells or base stations in a cell cluster, e.g. any one of pico eNB #1 to #4 in FIGS. 5 and 7, wherein the cell of the implementing base station is referred to as subject cell and the remaining cells in the cell cluster are referred to as neighboring cells.

As shown in FIG. 1, a procedure according to some embodiments of the present invention may comprise an operation (S110) of specifying a desired UL-DL configuration for TDD communication in a subject cell of a cellular communication system, an operation (S120) of obtaining at least one desired UL-DL configuration for TDD communication in at least one neighboring cell of the cellular communication system, wherein the at least one neighboring cell and the subject cell belong to the same cell cluster, and an operation (S130) of defining an UL-DL configuration for TDD communication for at least the subject cell of the cell cluster out of a set of predefined UL-DL configurations with flexible subframe patterns for flexible TDD communication on the basis of the specified desired UL-DL configuration for the subject cell and the obtained at least one desired UL-DL configuration for the at least one neighboring cell.

Accordingly, by such definition of a TDD configuration for at least the subject cell, i.e. the entire cell cluster or each cell of the cell cluster, coordination between the multiple cells belonging to the same cell cluster may be achieved so as to enable a TDD subframe re-/configuration satisfying the above requirement on active transmissions of all cells in the same cluster. That is to say, an appropriate re-/configuration of a TDD communication can be achieved/decided, which enables establishing appropriate TDD communications within the cell cluster.

In the operation S110, the subject cell may specify its own desired UL-DL configuration (for a subsequent configuration (period) in consideration of the recent traffic situation (e.g. including traffic fluctuations) in the subject cell. As described below, the desired UL-DL configuration of the subject cell may be issued to the other cluster members in an exchange time window within a TDD configuration period, i.e. the desired UL-DL configurations of all cells in the cell cluster may be exchanged thereby.

According to some embodiments of the present invention, the definition of the UL-DL configuration in operation S130 can be accomplished in various ways. Accordingly, different configuration modes can be defined and implemented in the cell cluster. In a first configuration mode, in which the same UL-DL configuration is required for the cell cluster, the UL-DL configuration is defined for all cells of the cell cluster based on priority factors of the subject cell and the at least one neighboring cell of the cell cluster. In a second configuration mode, in which different UL-DL configurations within the same subset of UL-DL configurations are allowed for the cell cluster, the UL-DL configuration is defined for the subject cell of the cell cluster based on subsets of the set of predefined UL-DL configurations.

Figure 2:
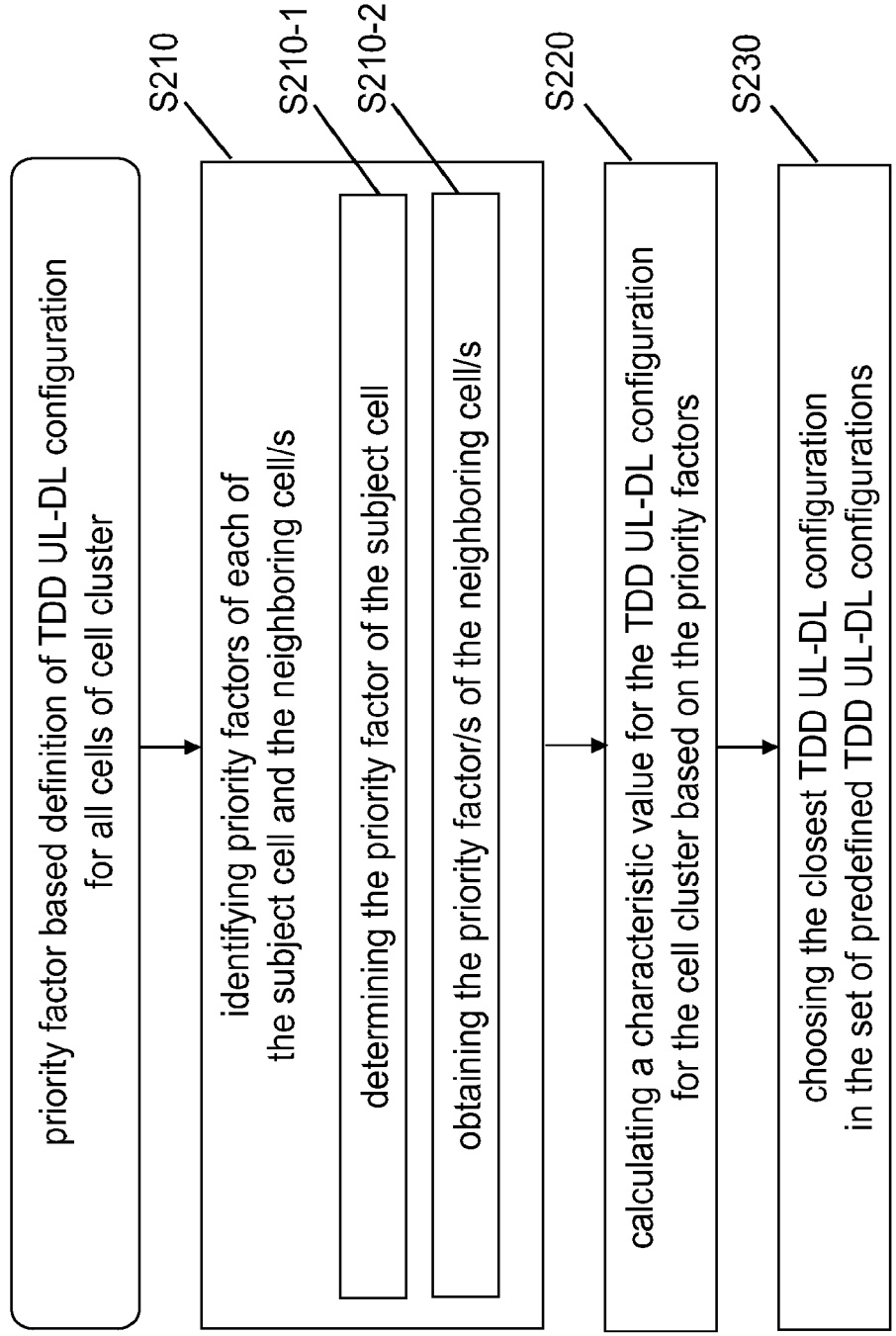
FIG. 2 shows a flowchart illustrating an example of a procedure for a priority factor based definition of a TDD UL-DL configuration for all cells of a cell cluster according to some embodiments of the present invention.

FIG. 2 shows a flowchart illustrating an example of a procedure for a priority factor based definition of a TDD UL-DL configuration for all cells of a cell cluster according to some embodiments of the present invention.

By way of the procedure shown in FIG. 2, the UL-DL configuration is defined for all cells of the cell cluster based on priority factors of the subject cell and the at least one neighboring cell of the cell cluster. That is, the thus illustrated example procedure is applicable (as the operation S130 of FIG. 1) in the aforementioned first configuration mode. When using the same TDD configuration within a cluster is enforced, then each cluster cell (e.g. pico eNB) may use the specified and obtained desired TDD configurations and corresponding priority factors of each cell from all cluster members to get a unified TDD configuration in the cell cluster. Thereby, the TDD configuration within one cluster could be all the same, i.e. either uplink or downlink in any subframe.

It is to be noted that the procedure illustrated in FIG. 2 represents an example for the definition of the TDD UL-DL configuration for at least the subject cell of the cell cluster according to some embodiments of the present invention. That is to say, the sequence of operations according to FIG. 2 corresponds to an example implementation of the operation S130 according to FIG. 1.

As shown in FIG. 2, a procedure according to some embodiments of the present invention may comprise an operation (S210) of identifying priority factors of each cell of the cell cluster, i.e. each of the subject cell and the at least one neighboring cell of the cell cluster, an operation (S220) of calculating a characteristic value for the UL-DL configuration for the cell cluster on the basis of the identified priority factors of each cell of the cell cluster and predetermined parameter values of each the desired UL-DL configuration for each cell of the cell cluster (which have been specified and obtained in the operations S110 and S120 according to FIG. 1), and an operation (S230) of choosing the UL-DL configuration in the set of predefined UL-DL configurations, the predetermined parameter value of which is closest to the calculated characteristic value for the UL-DL configuration for the cell cluster, as the UL-DL configuration for the cell cluster. Although not shown, the chosen UL-DL configuration may then be notified to neighbor clusters and/or the macro eNB to facilitate ICIC between clusters.

In the operation S210, the priority factors of each cell of the cell cluster may be identified in that the priority factor of the subject cell is (locally) determined (operation S210-1) and the priority factor/s of the neighboring cell/s is/are obtained (operation S210-2) from the base station/s thereof by way of a corresponding signaling explained below. That is, the priority factor of each cell of the cell cluster is decided locally at/by the corresponding (subject) cell, respectively. As described below, the priority factor of the subject cell may be issued to the other cluster members in an exchange time window within a TDD configuration period, i.e. the priority factors of all cells in the cell cluster may be exchanged thereby.

In the operation S210-1, the priority factor of the subject cell may be determined/decided by using various rules. In an initial configuration (period), the priority factor of each cell may be determined to be equal (i.e. a predetermined value such as 1) as a starting condition. In an initial or subsequent configuration (period), the priority factor of the subject cell may be based on a location of the subject cell with respect to the edge of the cell cluster such that cells around the cluster edge adopt a higher priority factor than cell cluster members located inside the cell cluster. In a subsequent configuration (period), the priority factor of the subject cell may additionally or alternatively be based on a degree of compromise in the preceding configuration (period), to which the subject cell has committed itself, such as a difference between the characteristic value for the UL-DL configuration for the cell cluster and the predetermined parameter value of the desired UL-DL configuration for the subject cell in a preceding UL-DL configuration definition.

In the operation S220, the characteristic value for the UL-DL configuration for the cell cluster may be calculated in various ways. Specifically, the previously identified priority factors may be utilized in that the predetermined parameter value of the specified desired UL-DL configuration for the subject cell is weighted with the identified priority factor of the subject cell, and the predetermined parameter value of the obtained at least one desired UL-DL configuration for the at least one neighboring cell is weighted with the corresponding identified priority factor of the at least one neighboring cell, respectively. The thus resulting weighted parameter values for each of the cells of the cell cluster may then be used for the calculation of the characteristic value for the UL-DL configuration for the cell cluster.

The predetermined parameter of an UL-DL configuration may for example be a ratio of the number of DL subframes to the number of UL subframes in the UL-DL configuration. The characteristic value for the UL-DL configuration for the cell cluster may for example be an (arithmetic) average of the predetermined parameter values of each the specified desired UL-DL configuration for the cells off the cell cluster.

Figure 5:
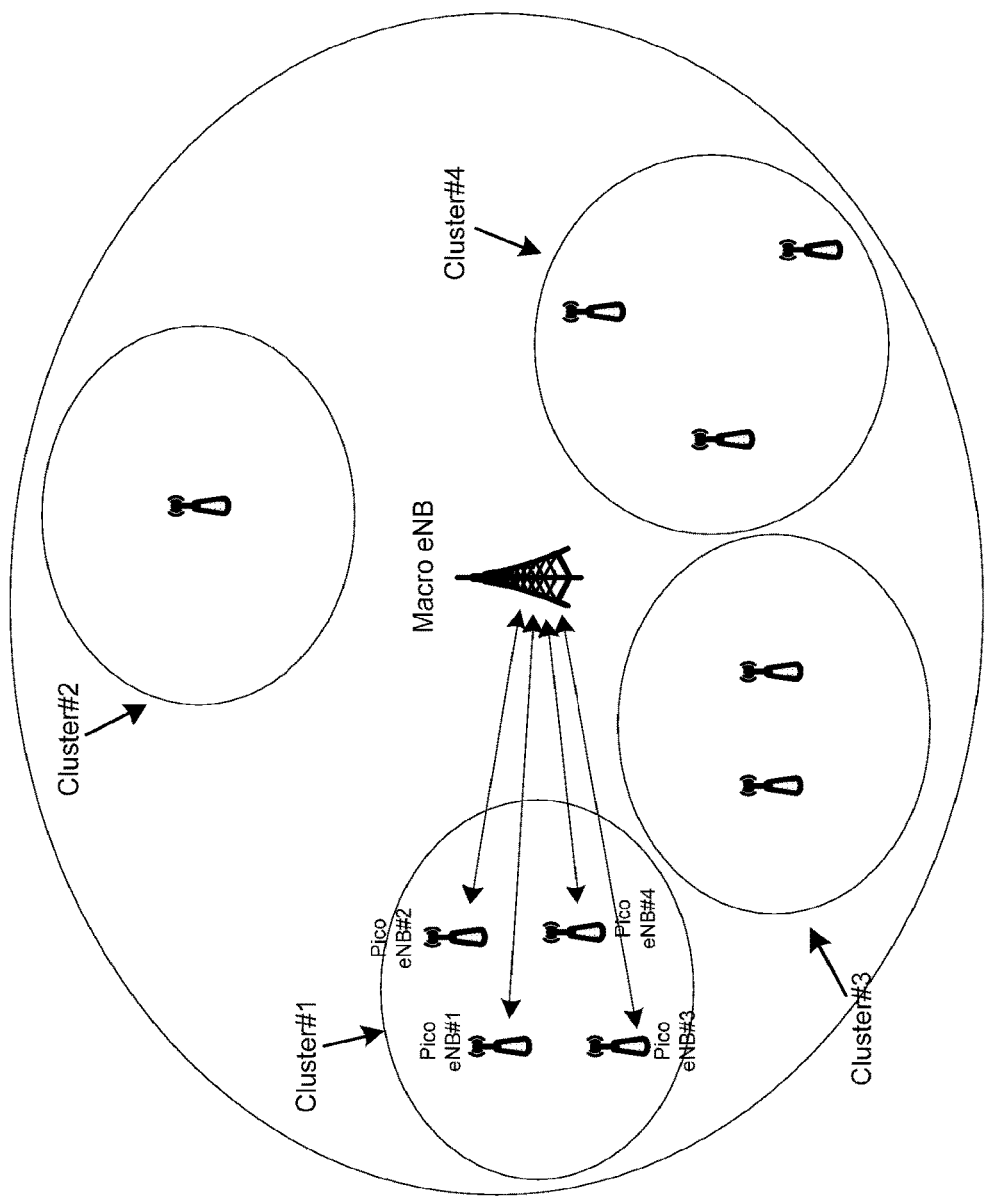
FIG. 5 shows a diagram illustrating an example of operability in an exemplary deployment scenario according to some embodiments of the present invention.
Figure 7:
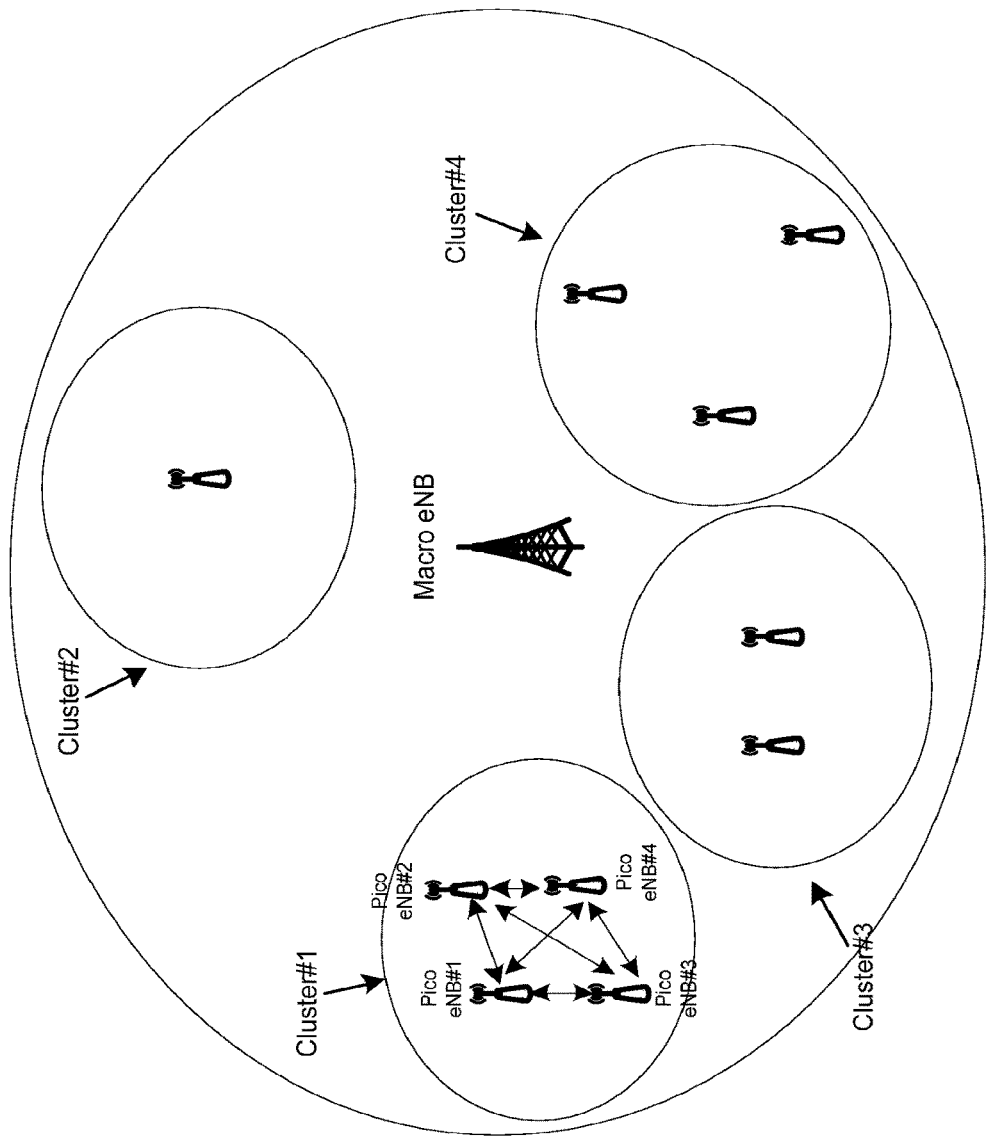
FIG. 7 shows a diagram illustrating another example of operability in the exemplary deployment scenario according to some embodiments of the present invention.

An example for the calculation of the characteristic value for the UL-DL configuration for the cell cluster is given with reference to the exemplary deployment scenario shown in FIGS. 5 and 7.

In an initial configuration (period), the priority factors of the cells of the cell cluster are assumed to equal (e.g. 1). For example, for the subsequent configuration (period), pico eNB #1 wants to use TDD configuration 0 (having a ratio D:L=4:6=0.67 which is used as the exemplary parameter value of cell #1), pico eNB #2 wants to use TDD configuration 1 (having a ratio D:L=6:4=1.5 which is used as the exemplary parameter value of cell #2), pico eNB #3 wants to use TDD configuration 3 (having a ratio D:L=7:3=2.33 which is used as the exemplary parameter value of cell #3), and pico eNB #4 wants to use TDD configuration 6 (having a ratio D:L=5:5=1 which is used as the exemplary parameter value of cell #4). As all of the priority factors are equal, the arithmetic average of the parameter values of all of the cluster members, i.e. the average D:L ratio, is 1.375 which is used as the characteristic value for the UL-DL configuration for the cell cluster. As the parameter value of TDD configuration 1 (i.e. 1.5) is closest to the calculated characteristic value for the UL-DL configuration for the cell cluster (i.e. 1.375) among the desired TDD configurations in the cell cluster, TDD configuration 1 is chosen as the UL-DL configuration for the cell cluster. Thus, TDD configuration 1 will be adopted for the subsequent configuration period, e.g. the next 200 ms period.

In the subsequent configuration (period), the priority factors of cells of the cell cluster are decided on the basis of the degree of compromise in the preceding configuration (period). In the preceding configuration (period), pico eNB #3 has compromised the most (and thus suffered more interference from neighboring clusters as the other cluster members). This is because the difference between the characteristic value for the UL-DL configuration for the cell cluster (i.e. 1.375) and the parameter value of TDD configuration 3 (i.e. 2.33), which has been desired by pico eNB #3, is the largest among the desired TDD configurations in the cell cluster. Hence, pico eNB #3 gets the highest priority factor or even a precedence in choosing the next TDD configuration. For example, for the subsequent configuration (period), pico eNB #1 wants to use TDD configuration 1 having a ratio (having a ratio D:L=6:4=1.5 which is used as the exemplary parameter value of cell #1), pico eNB #2 wants to use TDD configuration 0 (D:L=4:6=0.67 which is used as the exemplary parameter value of cell #2), pico eNB #3 wants to use TDD configuration 3 (having a ratio D:L=7:3=2.33 which is used as the exemplary parameter value of cell #3) and pico eNB #4 still wants to use TDD configuration 6 having a ratio (D:L=5:5=1 which is used as the exemplary parameter value of cell #4). As the priority factor of pico eNB #3 is higher than the other priority factors, it may be assumed that the arithmetic average of the parameter values of all of the cluster members becomes closest to the parameter value of TDD configuration 3 which is desired by pico eNB #3 because this time pico eNB #3's desired DL/UL ratio will get a higher weight in the calculation. Thus, TDD configuration 3 will be adopted for the subsequent configuration period, e.g. the next 200 ms period.

Accordingly, there is provided a priority based mechanism for cell coordination in a cell cluster to re-/configure or change a TDD configuration when using the same TDD configuration within the cell cluster is enforced, including corresponding procedures and related signaling as described herein.

By way of using the priorities or priority factors of the cell cluster members, some fairness between the cell cluster members could be ensured. This is because the priorities or priority factors take into consideration that some cluster members suffer or have suffered from more interference from other neighbor clusters compared with other cluster members (e.g. due to a location near the cluster edge, a higher degree of compromise in the preceding TDD configuration definition, etc.). The thus provided fairness, for example, is better than that obtainable by just considering the desired TDD configuration, i.e. the traffic of each cell in the cluster.

Figure 3:
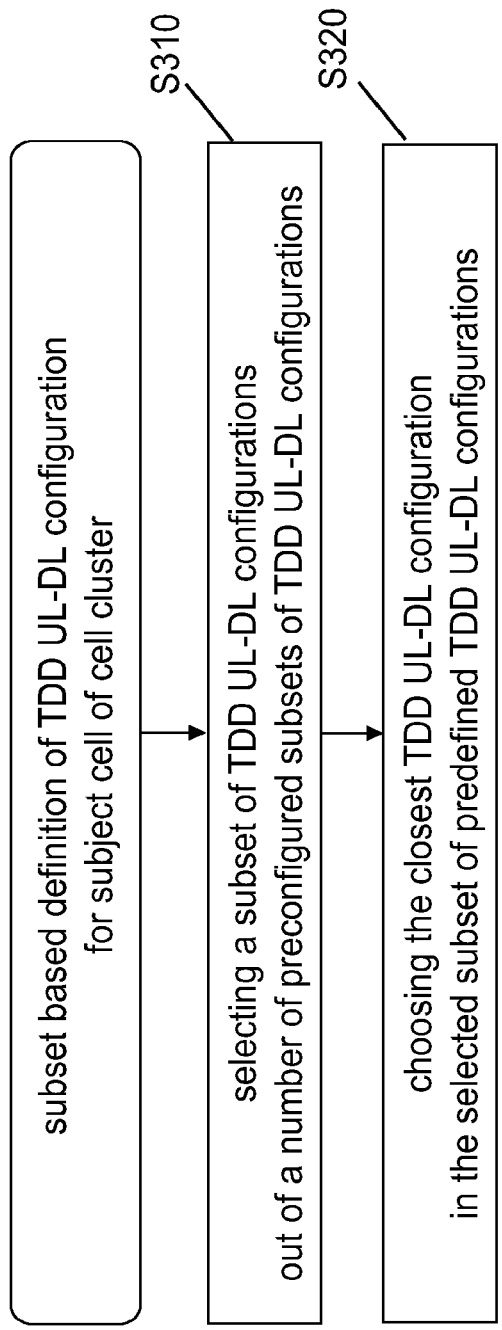
FIG. 3 shows a flowchart illustrating an example of a procedure for a subset based definition of a TDD UL-DL configuration for a subject cell of a cell cluster according to some embodiments of the present invention.

FIG. 3 shows a flowchart illustrating an example of a procedure for a subset based definition of a TDD UL-DL configuration for a subject cell of a cell cluster according to some embodiments of the present invention.

By way of the procedure shown in FIG. 3, the UL-DL configuration is defined for the subject cell of the cell cluster based on subsets of the set of predefined UL-DL configurations. That is, the thus illustrated example procedure is applicable (as the operation S130 of FIG. 1) in the aforementioned second configuration mode. When using different TDD configurations within the same TDD configuration subset is allowed within a cluster, each of the cluster cells may first decide which TDD configuration subset to use to get a unified TDD configuration subset in the cell cluster, and then each of the cluster cells may decide which TDD configuration in the TDD configurations subset to use to get a TDD configuration in the subject cell, respectively. Thereby, the TDD configuration subset within one cluster could be the same, i.e. either uplink or downlink in a subset of all subframes.

It is to be noted that the procedure illustrated in FIG. 3 represents an example for the definition of the TDD UL-DL configuration for at least the subject cell of the cell cluster according to some embodiments of the present invention. That is to say, the sequence of operations according to FIG. 3 corresponds to an example implementation of the operation S130 according to FIG. 1.

As shown in FIG. 3, a procedure according to some embodiments of the present invention may comprise an operation (S310) selecting one subset of UL-DL configurations out of a number of preconfigured subsets of UL-DL configurations, as the subset of UL-DL configuration for the cell cluster, on the basis of each of the desired UL-DL configurations for each cell of the cell cluster (which have been specified and obtained in the operations S110 and S120 according to FIG. 1), and an operation (S320) of choosing the UL-DL configuration in the selected subset of UL-DL configurations, which is closest to the specified desired UL-DL configuration for the subject cell, as the UL-DL configuration for the subject cell of the cell cluster. Although not shown, the chosen UL-DL configuration may then be notified the other cluster members and/or the macro eNB to facilitate ICIC within the cluster.

The subsets of UL-DL configurations may be preconfigured based on a downlink-to-uplink switch point periodicity of the predefined UL-DL configurations. Namely, two TDD configuration subsets may be defined based on the DL-to-UL switch point periodicity, i.e. 5 ms or 10 ms, which is effective to reduce the DL-to-UL interference (especially during the second half of one frame). Accordingly, a first subset with a DL-to-UL switch point periodicity of 5 ms may comprise TDD configurations 0, 1, 2, 6, while a second subset with a DL-to-UL switch point periodicity of 10 ms may comprise TDD configurations 3, 4, 5.

While the pre-configuration of subsets of UL-DL configurations is not restricted to the above approach on the basis of the DL-to-UL switch point periodicity, this approach is effective and efficient, for example. This is because this approach beneficially provides a trade-off between traffic adaptation and interference mitigation. If all members within a cluster use the same TDD configuration, then there is no inter-cell cross-link interference among the members within this cluster, but some members have to use the unified TDD configuration which is not their favorite TDD configuration, which will impact the traffic adaptation gain. This disadvantage is mitigated by a subset pre-configuration on the basis of the DL-to-UL switch point periodicity.

In this regard, it is to be noted that the main difference between the TDD configurations lies in the latter part of the frame (i.e. in subframes 5 to 9). So, the UL SINR of a (small cell) UE will suffer much severer DL interference during the second half of one frame, since configurations with 10 ms switch-point periodicity have all-DL transmission in subframes 5 to 9. Therefore, it is effective to put TDD configurations 0, 1, 2, 6 in one subset and TDD configurations 3, 4, 5 in another subset. The reason why different TDD configurations within the same subset could achieve a trade-off between traffic adaptation and interference mitigation is the following. If all cells within one cluster use the same TDD configuration, then the interference mitigation gain is the biggest, since there will be no inter-cell cross-link interference among cluster members, but the traffic adaptation gain is the smallest, since every cluster cell uses the same TDD configuration, which may not be their most desired TDD configuration according to their traffic. If all cells within one cluster use their most desired TDD configuration, then the traffic adaptation gain can be higher, since every cluster cell could use its most desired TDD configuration which matches its traffic well, but the interference mitigation gain may be the smallest, since there may be severe inter-cell cross-link interference (especially DL-to-UL interference) without any coordination. Defining the TDD configuration on the basis of a subset-related approach, could thus enable a compromise between these detrimental effects.

In the operation S310, the subset of UL-DL configurations, to which the highest number of desired UL-DL configurations for the cells of the cell cluster belongs or to which the highest number of configuration requests in the cell cluster relates, may be selected as the subset of UL-DL configuration for the cell cluster. For example, after receiving desired TDD configuration requests from other cells in the cluster, each cell may count the number of desired UL-DL configuration or related request belonging to each of the preconfigured subsets, and may choose the subset with a higher number, i.e. with more desired configurations and/or requests, as the final subset to use in the cluster.

In the operation S320, the closeness of the own desired UL-DL configuration and the UL-DL configurations in the selected subset may be determined in various ways. For example, the closeness may be determined by a different on the basis of the D:L ratio as explained above and/or a number of subframes with coincident link direction (i.e. UL or DL).

An example for the calculation of the above procedure is given with reference to the exemplary deployment scenario shown in FIGS. 5 and 7.

For example, for the subsequent configuration (period), pico eNB #1 wants to use TDD configuration 0 (having a ratio D:L=4:6=~0.67 which is used as the exemplary parameter value of cell #1), pico eNB #2 wants to use TDD configuration 1 (having a ratio D:L=6:4=1.5 which is used as the exemplary parameter value of cell #2), pico eNB #3 wants to use TDD configuration 3 (having a ratio D:L=7:3=2.33 which is used as the exemplary parameter value of cell #3), and pico eNB #4 wants to use TDD configuration 6 (having a ratio D:L=5:5=1 which is used as the exemplary parameter value of cell #4). With the above-indicated pre-configuration of TDD configuration subsets, 3 desired TDD configurations (or related requests) belong to the first subset, while only 1 desired TDD configuration (or related request) belongs to the first subset. Hence, the first subset with a DL-to-UL switch point periodicity of 5 ms comprising TDD configurations 0, 1, 2, 6 is selected as the TDD configuration subset for the cell cluster.

Then, pico eNB #1 chooses TDD configuration 1 corresponding to the desired UL-DL configuration of the subject cell as the UL-DL configuration for the subject cell, pico eNB #2 chooses TDD configuration 1 corresponding to the desired UL-DL configuration of the subject cell as the UL-DL configuration for the subject cell, and pico eNB #4 chooses TDD configuration 6 corresponding to the desired UL-DL configuration of the subject cell as the UL-DL configuration for the subject cell. Assuming pico eNB #3 as the subject cell, pico eNB #3 may choose TDD configuration 1 (not corresponding to the actually desired TDD configuration 3 of the subject cell) as the UL-DL configuration for the subject cell, as the difference in the D:L ratio is lowest between the desired TDD configuration (i.e. TDD configuration 3) and any one of the TDD configurations in the selected subset (i.e. TDD configurations 0, 1, 2, 6).

Accordingly, there is provided a subset based mechanism for cell coordination in a cell cluster to re-/configure or change a TDD configuration when using different TDD configurations within the same TDD configuration subset within the cell cluster is allowed, including corresponding procedures and related signaling as described herein.

Figure 4:
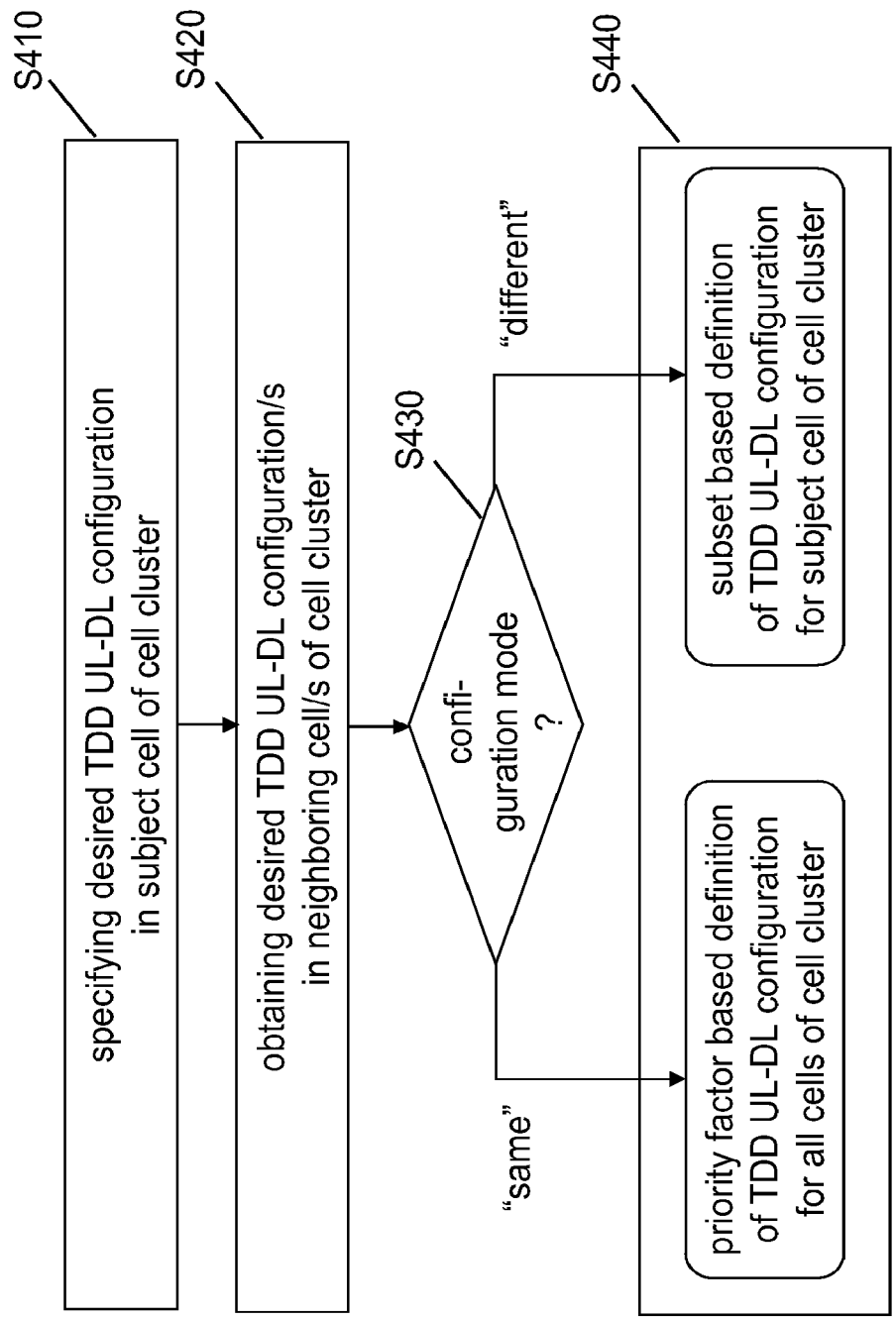
FIG. 4 shows a flowchart illustrating another example of a procedure for a cell clustering based configuration of a flexible TDD communication according to some embodiments of the present invention.

FIG. 4 shows a flowchart illustrating another example of a procedure for a cell clustering based configuration of a flexible TDD communication according to some embodiments of the present invention. Similar to FIG. 1, the thus illustrated example procedure may be implemented at or by any one of the cells or base stations in a cell cluster, e.g. any one of pico eNB #1 to #4 in FIGS. 5 and 7, wherein the cell of the implementing base station is referred to as subject cell and the remaining cells in the cell cluster are referred to as neighboring cells.

As shown in FIG. 4, the operations S410, S420 and S440 basically correspond to the operations S110, S120 and S130 of FIG. 1, respectively. Accordingly, a detailed description thereof is omitted and reference is made to h above description of FIG. 1.

The procedure according to some embodiments of the present invention, as shown in FIG. 4, additionally comprises an operation (S430) discriminating between the aforementioned configuration modes. Thereby, the procedure for the definition of the TDD configuration is configurable. Namely, in case of determining the first configuration mode ("same") in which the same UL configuration is required for the cell cluster, the priority factor based definition of the UL-DL configuration for all cells of the cell cluster (as illustrated in FIG. 2) is adopted in the operation S440, while in case the second configuration mode ("different") in which different UL-DL configurations within the same subset of UL-DL configurations are allowed for the cell cluster, the subset based definition of the UL-DL configuration for the subject cell of the cell cluster (as illustrated in FIG. 3) is adopted in the operation S440.

In the operation S430, the configuration mode discrimination may be based on a corresponding indication or instruction, which may for example be received from a (controlling/serving) base station (e.g. of a higher network layer) by way of a corresponding signaling explained below.

Accordingly, there is provided flexibility for the usage of the mechanism for cell coordination in a cell cluster to re-/configure or change a TDD configuration on the basis of different configuration modes (corresponding to different configuration scenarios, as explained above).

In the following, an exemplary sequence of operations will be exemplified on the basis of the above with reference to the exemplary deployment scenario of FIGS. 5 and 7.

FIG. 5 shows a diagram illustrating an example of operability in an exemplary deployment scenario according to some embodiments of the present invention.

After cluster #1 is formed, which is adopted as the cell cluster in question, the macro eNB may re-/configure the TDD configuration mode to the cluster members e.g. via an X2 interface. In this regard, the macro eNB may also configure an exchange time window for the exchange of cell-specific information for defining the UL-DL configuration/s in the cell cluster to the cluster members e.g. via an X2 interface. Such cell-specific information comprise the desired UL-DL configurations (for the next configuration (period)) for each of the cluster members, and may also comprise other required or beneficial information, such as e.g. priority factors and/or a cluster ID which is usable for the cluster members to recognize which requests received from other cluster cells (e.g. pico eNBs) should be considered, i.e. whether the cell-specific information relates to the same cluster or a different cluster.

For example, one or both of the aforementioned indications may be signaled in the context of load management/indication, e.g. by means of a LOAD INFORMATION message. Such LOAD INFORMATION message may be sent by the macro eNB to micro, pico or femto eNBs of a subject cell cluster to transfer load and interference coordination information, and may for example exhibit the following or a similar format, in which M represents mandatory presence and O represents optional presence, while the references relate to corresponding sections in the standard specification 3GPP TS 36.423 V11.3.0 (2012-12).

| IE/Group Name | Presence | Range | IE type & reference | Semantics description | Criticality | Assigned Criticality |
|---|---|---|---|---|---|---|
| Message Type | M | | 9.2.13 | | YES | ignore |
| Cell Information | M | | | | YES | ignore |
| > Cell Information Item | | 1 ... <maxCellineNB> | | | EACH | ignore |
| >> Cell ID | M | | ECGI 9.2.14 | Id of the source cell | — | — |
| >> UL Interference Overload Indication | O | | 9.2.17 | | — | — |
| >> UL High Interference Information | | 0 ... <maxCellineNB> | | | — | — |
| >>> Target Cell ID | M | | ECGI 9.2.14 | Id of the cell for which the HII is meant | — | — |
| >>> UL High Interference Indication | M | | 9.2.18 | | — | — |
| >> TDD Configuration Mode | O | | ENUMERATED (same, different) | | | |
| >> TDD Reconfiguration Window | | | | | YES | reject |
| >>> Starting offset | O | | INTEGER (1 ... 640) | | — | — |
| >>> Duration | O | | INTEGER (1 ... 640) | | — | — |
| >> Relative Narrowband Tx Power (RNTP) | O | | 9.2.19 | | — | — |
| >> ABS Information | O | | 9.2.54 | | YES | ignore |
| >> Invoke Indication | O | | 9.2.55 | | YES | ignore |

As evident from the exemplary format above, an information element "TDD Configuration Mode" and an information element "TDD Reconfiguration Window" are contained, wherein one or both of these may be utilized for the indication/s according to some embodiments of the preset invention. In the "TDD Configuration Mode" IE, the configuration mode could be indicated as "same" or "different" as explained above. In the "TDD Reconfiguration Window" IE, the exchange time window could be indicated/defined by way of the start time (e.g. a starting offset from the begin of a re-/configuration period) and the length of the exchange time window.

Accordingly, there is provided a mechanism for setting a configuration mode in a cell cluster (i.e. a way of indication such the configuration mode by a macro base station via a specific signaling).

Figure 6:
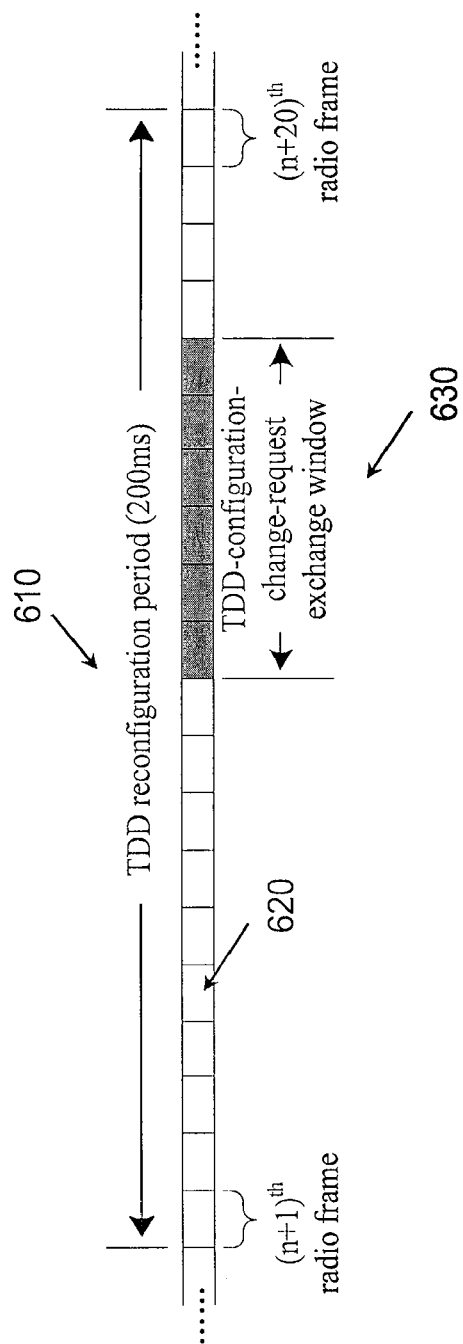
FIG. 6 shows a diagram illustrating an example of an exchange time window in a configuration period according to some embodiments of the present invention.

FIG. 6 shows a diagram illustrating an example of an exchange time window in a configuration period according to some embodiments of the present invention.

As shown in FIG. 6, a TDD reconfiguration period 610 (i.e. a configuration period) is assumed to comprise 20 radio frames 620 of a direction of 10 ms each. Thus, the TDD reconfiguration period 610 has a duration of 200 ms, i.e. the TDD reconfiguration time scale is 200 ms. In the illustrated example, it is assumed that the exchange time window 630 ranges from the 11th radio frame to the 16th radio frame in the configuration period 610. Such exchange time window could be configured by setting "Starting offset" to 11 (radio frames) or 110 (ms) and setting "Duration" to 6 (radio frames) or 60 (ms) in the "TDD Reconfiguration Window" IE.

The configuration of the exchange time window in the midst of the configuration period, not at the start or end thereof, is specifically efficient and effective. Thereby, it may be prevented that cells in a cluster send their TDD configuration request to other cluster members at the beginning of one TDD reconfiguration period, which could be inefficient, since cluster cells could not get accurate traffic fluctuation status in a current period and cannot predict the accurate desired TDD configuration for the next period. Also, it may be prevented that cells in a cluster send their TDD configuration request to other cluster members at the end of one TDD reconfiguration period, which could be problematic, since the cluster members could not have enough time to receive or process the request from other cluster members which could lead to an incorrect TDD configuration.

More specifically, while the above configuration of the exchange time window represents only an example to which the present invention is not limited, such configuration has certain advantages/effects as follows. The reason to choose the (n+11)th radio frame as the start (starting offset) of the exchange time window is that, if the starting offset is too early, e.g. the (n+2)th radio frame, the cluster cell may not get accurate traffic fluctuation status in the current period and cannot predict the desired TDD configuration for the next period because this period just starts (start from the (n+1)th radio frame). Otherwise, if the cluster cell sends out the request with a larger starting offset, e.g. the (n+11)th, it has a bigger chance to know its traffic situation in the current period and to be able to predict the desired TDD configuration in the next period more accurately. The reason to choose six radio frames as length/duration of the exchange time window is that the transmission delay of a current (e.g. X2) interface is about 20 ms (i.e. two radio frames) and it is required that enough time is left for the (e.g. small cell) eNBs to exchange their desired TDD configuration requests. Also, it is required to leave enough time for the cluster cells (e.g. pico eNBs) to process the received TDD configuration requests from other cells within the cluster and to get/define/decide the new TDD configuration for the next period.

The exchange time window is used to coordinate the behavior of cells within one cluster to get a new TDD UL-DL configuration for the next configuration period. Without this exchange time window, each cluster cell would have to listen to coordination messages of other cells within the cluster at any time. Moreover, it is possible that the coordination of a TDD UL-DL configuration may fail without this exchange time window. For example, if the TDD reconfiguration time scale is 100 ms and one cluster cell sends out its coordination message at the last subframe of such 100 ms configuration period, other small cells will not get its message because of the transmission delay of the (e.g. X2) interface there-between and processing delay of each small cell, which may lead to a wrong new TDD UL-DL configuration for the new configuration period.

After the TDD configuration mode and the exchange time window are configured, the small cells could start to exchange their desired TDD configurations according to the time window parameters. For example, at the (n+1)th radio frame (n being an integer multiple of 10 and denoting the number of the configuration period in question), the exchange time window starts and pico eNB #1, 2, 3 and 4 start to exchange their desired TDD configuration for the next 200 ms period. At the (n+31)th radio frame, the time window starts again and pico eNB #1, 2, 3 and 4 start again to exchange their desired TDD configuration for the next 200 ms period For example, the desired TDD configuration of a subject cell may be issued/signaled to the other cluster members e.g. by means of an ENB CONFIGURATION UPDATE message. Such ENB CONFIGURATION UPDATE message may be sent by a micro, pico or femto eNB to another micro, pico or femto eNBs of a subject cell cluster to transfer updated information, and may for example exhibit the following or a similar format, in which M represents mandatory presence and O represents optional presence, while the references relate to corresponding sections in the standard specification 3GPP TS 36.423 V11.3.0 (2012-12).

| IE/Group Name | Presence | Range | IE type & reference | Semantics description | Criticality | Assigned Criticality |
|---|---|---|---|---|---|---|
| Message Type | M | | 9.2.13 | | YES | reject |
| Cluster Information | | | | | YES | reject |
| > Cluster ID | O | | | The value needed to identify a cluster | YES | reject |
| > Cluster size | O | | | Identity the member number of cluster | YES | reject |
| > Desired Config | O | | ENUMERATED (sa0, sa1, sa2, sa3, sa4, sa5, sa6, . . . ) | Uplink-downlink subframe configuration information defined in ref. TS 36.211 | YES | reject |
| Served Cells To Add | | 0 . . . <maxCellineNB> | | Complete list of added cells served by the eNB | GLOBAL | reject |
| > Served Cell Information | M | | 9.2.8 | | — | — |
| . . . | . . . | . . . | . . . | . . . | . . . | . . . |
| Served Cells To Delete | | 0 . . . <maxCellineNB> | | Complete list of deleted cells served by the eNB | GLOBAL | reject |
| > Old ECGI | M | | ECGI 9.2.14 | This is the old E-UTRAN Cell Global Identifier of the cell to be deleted | — | — |
| GU Group Id To Add List | | 0 . . . <maxPools> | | | GLOBAL | reject |
| > GU Group Id | M | | 9.2.20 | | — | — |
| GU Group Id To Delete List | | 0 . . . <maxPools> | | | GLOBAL | reject |
| > GU Group Id | M | | 9.2.20 | | — | — |

As evident from the exemplary format above, an information element "Cluster Information" is contained, which may be utilized for indication/s according to some embodiments of the preset invention. In particular, the desired TDD configuration may be signaled therein.

Although not illustrated in the exemplary format above, the priority factor of the subject cell may also be signaled to the other cluster members in such ENB CONFIGURATION UPDATE message. To this end, a dedicated information element for the priority factor may be included, or the priority factor may be indicated as an element in the information element "Cluster Information".

FIG. 7 shows a diagram illustrating another example of operability in the exemplary deployment scenario according to some embodiments of the present invention. In FIG. 7, the mutual exchange of cell-specific information among the cluster members of the cell cluster in question is exemplarily illustrated.

While it is described and illustrated that the cells of the cell cluster exchange the cell-specific information among each other, they could also signal their respective cell-specific information to the macro cell (e.g. by way of a corresponding ENB CONFIGURATION UPDATE message via an X2 interface), and the macro eNB may distribute the thus collected cell-specific information among all cluster members (within the exchange time window) or define the TDD configuration/s in the cell cluster based on the thus collected cell-specific information in accordance with any one of the above-described procedures and instruct cluster members accordingly.

After the exchange time window expires and a cell receives a TDD re-/configuration request from one or more cluster members, the base station of this subject cell performs the procedure according to any one of FIGS. 1 and 4 explained above.

Referring to FIGS. 5 and 7, after completion of a configuration procedure, any one of the respective subject cells may issue/signal the thus defined UL-DL configuration to the remaining cells of the cell cluster and/or the macro eNB, i.e. a base station of a superordinate cell of the cellular communication system, wherein the cells of the cell cluster are associated with the superordinate cell. As mentioned above, it is also possible that any one of the respective subject cells may issue/signal the thus defined UL-DL configuration to another macro eNB, i.e. the macro eNB controlling/serving or associated with another cell cluster.

Figure 8:
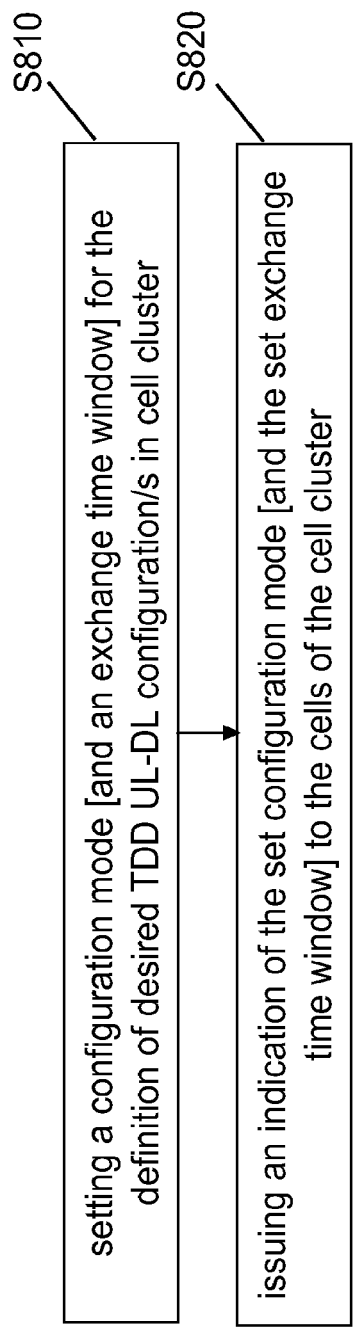
FIG. 8 shows a flowchart illustrating an example of a procedure for instructing a cell clustering based configuration of a flexible TDD communication according to some embodiments of the present invention.

FIG. 8 shows a flowchart illustrating an example of a procedure for instructing a cell clustering based configuration of a flexible TDD communication according to some embodiments of the present invention. The thus illustrated example procedure may be implemented at or by a superordinate cell or base station, e.g. the macro eNB in FIGS. 5 and 7.

As shown in FIG. 8, a corresponding procedure according to some embodiments of the present invention may comprise an operation (S810) of setting a configuration mode for defining an UL-DL configuration for TDD communication out of a set of predefined UL-DL configurations with flexible subframe patterns for flexible TDD communication for at least one cell of a cell cluster on the basis of a desired uplink-downlink configuration for a subject cell and at least one desired uplink-downlink configuration for at least one neighboring cell, wherein the at least one neighboring cell and the subject cell belong to the same cell cluster, and an operation (S820) of issuing an indication of the set configuration mode to all cells of the cell cluster, which indicates one of a first configuration mode in which the same UL-DL configuration is required for the cell cluster and a second configuration mode in which different UL-DL configurations within the same subset of the set of predefined UL-DL configurations are allowed for the cell cluster.

Further, as indicated by square brackets in FIG. 8, such procedure at/by the macro eNB may optionally comprise an operation of setting an exchange time window for exchanging cell-specific information for defining the UL-DL configuration in the at least one cell of the cell cluster between the cells of the cell cluster, and an operation of issuing an indication of the set exchange time window to all cells of the cell cluster. Such indication of the set exchange time window may comprise a definition of the exchange time window to have a specified duration starting at a specified offset from the start of the time division duplex configuration period and ending prior to the end of the time division duplex configuration period. As described above, both indications may be issued by way of the same message such as a LOAD INFORMATION message via an X2 interface.

Still further, as indicated by the arrows from the cell cluster to the macro eNB in FIG. 5, such procedure at/by the macro eNB may comprise an operation of obtaining the defined UL-DL configuration/s for TDD communication in the at least one cell of the cell cluster from the at least one cell of the cell cluster and, potentially, utilizing the thus obtained UL-DL configuration/s for the purpose of an ICIC scheme.

In view of the above, the previously explained procedures for the definition of the UL-DL configuration in a cell cluster are performed per configuration period (i.e. TDD reconfiguration period). That is, a corresponding exchange of cell-specific information in this regard is accomplished once in each configuration period, i.e. in the configured exchange time window thereof, and the TDD configuration is defined once in each configuration period, i.e. with the cell-specific information exchanged in the exchange time window of the preceding configuration period.

In view of the above, exemplary embodiments of the present invention enable a cell clustering based configuration of flexible TDD communication. Namely, the usage of an appropriate TDD UL-DL configuration in the entire cell cluster or in each cell of the cell cluster can be coordinated in flexible TDD re-/configuration, thereby ensuring that active transmissions of all cells in the cell cluster are either uplink or downlink in any subframe or a subset of all subframes.

By virtue of some embodiments of the present invention, two different approaches with related signaling are presented to perform the coordination among cells belonging to the same cell cluster to re-/configure or change a TDD configuration, wherein one approach is usable for the scenario where the same TDD configuration in one cluster is enforced, while the other approach is usable for the scenario where different TDD configurations within the same TDD configuration subset in one cluster are allowed. Accordingly, there is provided the flexibility of using the same TDD configuration or different TDD configurations of the same subset within a cell cluster.

By virtue of some embodiments of the present invention, the coordination among cells belonging to the same cell cluster to re-/configure or change a TDD configuration may be accomplished once per configuration period, which may be achieved by an exchange time window mechanism within each configuration period. Such coordination approach is specifically effective when the TDD reconfiguration time scale is longer than a certain threshold, e.g. for a TDD reconfiguration time scale of 200 ms or 640 ms. Otherwise, with a shorter TDD reconfiguration time scale e.g. of 10 ms, such coordination approach might be dispensable and thus omitted. This is because, for clusters with a TDD reconfiguration time scale of 10 ms, it is most likely that there is only one cell within a cluster for such fast configuration change. And even there are more than one cell in one cluster, it is hard to do coordination with such short time scale, thus it needs to define detection rules to perform TDD configuration change. Accordingly, applicability of such coordination approach according to some embodiments of the present invention may be discriminated e.g. by a macro base station controlling/serving or associated with a certain cell cluster for this cell cluster on the basis of the actual/desired/required TDD reconfiguration time scale.

Accordingly, an efficient coordination mechanism for a cell clustering based configuration of flexible TDD communication is presented, which may prevent that cell clusters may get inefficient or even wrong TDD configurations for the cluster members. That is, the aforementioned requirement on active transmissions of all cells in the same cluster can be satisfied in a timely, efficient and effective manner.

Generally, the above-described procedures and functions may be implemented by respective functional elements, processors, or the like, as described below.

While in the foregoing some embodiments of the present invention are described mainly with reference to methods, procedures and functions, corresponding embodiments of the present invention also cover respective apparatuses, network nodes and systems, including both software and/or hardware thereof.

Respective embodiments of the present invention are described below referring to FIG. 9, while for the sake of brevity reference is made to the detailed description with regard to FIGS. 1 to 8.

Figure 9:
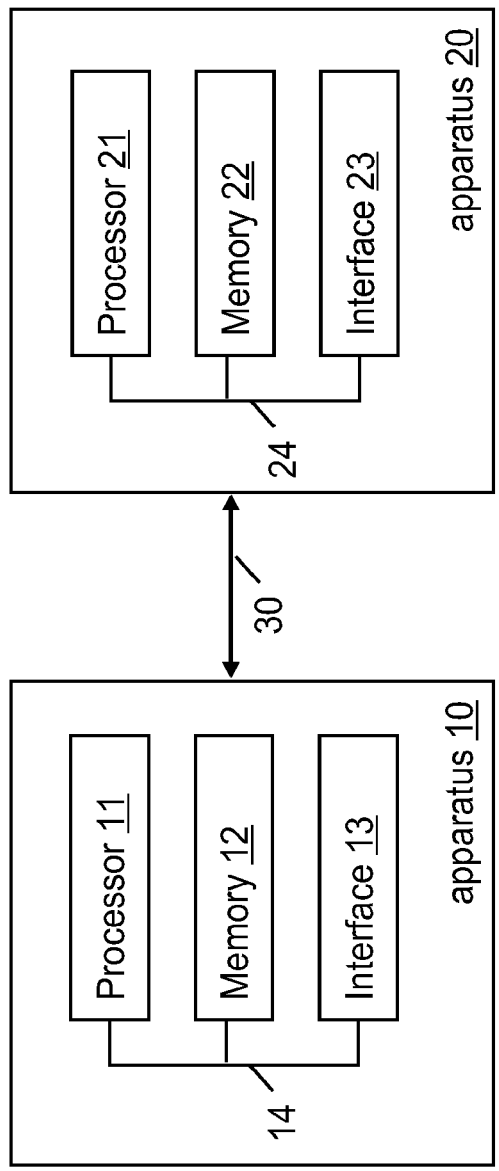
FIG. 9 shows a schematic block diagram illustrating exemplary apparatuses according to some embodiments of the present invention.

In FIG. 9 below, which is noted to represent a simplified block diagram, the solid line blocks are basically configured to perform respective operations as described above. The entirety of solid line blocks are basically configured to perform the methods and operations as described above, respectively. With respect to FIG. 9, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 9, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 9 shows a schematic block diagram illustrating exemplary apparatuses according to some embodiments of the present invention.

In view of the above, the thus illustrated apparatuses 10 and 20 are suitable for use in practicing some embodiments of the present invention, as described herein.

Any one of the illustrated apparatuses 10 and 20 corresponds to an entity which may represent a (part of a) base station of a cellular communication system such as an eNB of a LTE/LTE-A system or the like, or a corresponding modem (which may be installed as part thereof, but may be also a separate module, which can be attached to various devices, as described above). For example, the illustrated apparatus 10 may correspond to an entity which may represent a (part of a) base station of a lower/subordinate (logical/network) layer of a heterogeneous cellular communication system such as a small cell base station like any one of the pico eNBs in FIGS. 5 and 7. Accordingly, the apparatus 10 may be configured to perform a procedure and/or functionality, as described in conjunction with any one of FIGS. 1 to 4. Also, the illustrated apparatus 20 may correspond to an entity which may represent a (part of a) base station of a higher/superordinate (logical/network) layer of a heterogeneous cellular communication system such as a macro cell base station like the macro eNB in FIGS. 5 and 7.

Generally, any apparatus according to some embodiments of the present invention may comprise a processing system. Such processing system may comprise at least one processor and at least one memory including computer program code, and (possibly) at least one interface configured for communication with at least another apparatus.

As indicated in FIG. 9, according to some embodiments of the present invention, each of the apparatuses may comprise at least one processor 11/21, at least one memory 12/22 and at least one interface 13/23, which are connected by at least one bus 14/24 or the like, and the apparatuses may be connected via at least one corresponding link, interface or connection 30, respectively.

The processor 11/21 and/or the interface 13/23 may be facilitated for communication over a (hardwire or wireless) link, respectively. The interface 13/23 may comprise a suitable receiver or a suitable transmitter-receiver combination or transceiver, which is coupled to one or more antennas or communication means for (hardwire or wireless) communications with the linked or connected device(s), respectively. The interface 13/23 is generally configured to communicate with another apparatus, i.e. the interface thereof.

The memory 12/22 may store respective programs assumed to include program instructions or computer program code that, when executed by the respective processor, enables the respective electronic device or apparatus to operate in accordance with some embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

Exemplarily assuming that the apparatus 10 relates to a small cell base station, the apparatus 10 or its processor 11 (or a processing system thereof) according to some embodiments of the present invention is configured to perform, at least, specifying a desired uplink-downlink configuration for time division duplex communication in a subject cell of a cellular communication system, obtaining at least one desired uplink-downlink configuration for time division duplex communication in at least one neighboring cell of the cellular communication system, wherein the at least one neighboring cell and the subject cell belong to the same cell cluster, and defining an uplink-downlink configuration for time division duplex communication for at least the subject cell of the cell cluster out of a set of predefined uplink-downlink configurations with flexible subframe patterns for flexible time division duplex communication on the basis of the specified desired uplink-downlink configuration for the subject cell and the obtained at least one desired uplink-downlink configuration for the at least one neighboring cell.

Exemplarily assuming that the apparatus 20 relates to a macro cell base station, the apparatus 20 or its processor 21 (or a processing system thereof) according to some embodiments of the present invention is configured to perform, at least, setting a configuration mode for defining an uplink-downlink configuration out of a set of predefined uplink-downlink configurations with flexible subframe patterns for flexible time division duplex communication for at least one cell of a cell cluster, and issuing an indication of the set configuration mode to all cells of the cell cluster, which indicates one of a first configuration mode in which the same uplink-downlink configuration is required for the cell cluster and a second configuration mode in which different uplink-downlink configurations within the same subset of the set of predefined uplink-downlink configurations are allowed for the cell cluster.

For further details of specifics regarding functionalities according to some embodiments of the present invention, reference is made to the foregoing description in conjunction with FIGS. 1 to 8.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or some embodiments thereof provide measures for cell clustering based configuration of flexible time division duplex communication, such as e.g. in layered heterogeneous network deployments. Such measures may exemplarily comprise measures for specifying a desired uplink-downlink configuration for time division duplex communication in a subject cell of a cellular communication system, obtaining at least one desired uplink-downlink configuration for time division duplex communication in at least one neighboring cell of the cellular communication system, wherein the at least one neighboring cell and the subject cell belong to the same cell cluster, and defining an uplink-downlink configuration for time division duplex communication in at least the subject cell of the cell cluster out of a set of predefined uplink-downlink configurations with flexible subframe patterns for flexible time division duplex communication on the basis of the specified desired uplink-downlink configuration for the subject cell and the obtained at least one desired uplink-downlink configuration for the at least one neighboring cell.

Even though the present invention and/or some embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ABS Almost Blank Subframe
CCIM Cell Clustering Interference Mitigation
CI I Cross-link Interference Indication
DL Downlink
ECGI E-UTRAN Cell Global ID
eICIC Enhanced Inter-Cell Interference Coordination
eIMTA enhancements to Interference Management & Traffic Adaptation
eNB evolved Node B (E-UTRAN base station)
ICIC Inter-Cell Interference Coordination
HI I High Interference Indication
I E Information Element
LA Local Area
LTE Long Term Evolution
LTE-A Long Term Evolution Advanced
OI Overload Indication
SINR Signal to Interference plus Noise Ratio
TDD Time Division Duplex
Tx Transmit/Transmission
UE User Equipment
UL Uplink
UMTS Universal Mobile Telecommunications System
UTRAN UMTS Terrestrial Radio Access Network

What is claimed is:

1. An apparatus, comprising:
a memory, and
a processor configured to define, for a subject cell of a cellular communication system, an uplink-downlink configuration for time division duplex (TDD) communication out of a set of predefined uplink-downlink configurations with flexible subframe patterns for flexible TDD communication, wherein
the processor defines the uplink-downlink configuration based on a first desired uplink-downlink configuration in the subject cell, and a second desired uplink-downlink configuration in a neighboring cell of the cellular communication system, the neighboring cell and the subject cell belonging to a same cell cluster of the cellular communication system, and
to define the uplink-downlink configuration, the processor is configured to:
calculate a characteristic value based on parameter values of the first desired uplink-downlink configuration and the second desired uplink-downlink configuration; and
select, from the set of predefined uplink-downlink configurations, a particular uplink-downlink configuration that has a parameter value closest to the calculated characteristic value, as the uplink-downlink configuration for the subject cell.

2. The apparatus according to claim 1, wherein a parameter value of the first desired uplink-downlink configuration is a ratio of a number of downlink subframes to a number of uplink subframes in the first desired uplink-downlink configuration.

3. The apparatus according to claim 1, wherein the characteristic value is an average of the parameter values of the first desired uplink-downlink configuration and the second desired uplink-downlink configuration.

4. The apparatus according to claim 1, wherein
the processor is configured to identify priority factors of the subject cell and the neighboring cell by:
determining a priority factor of the subject cell based on at least one of a location of the subject cell with respect to an edge of the cell cluster and a difference between the characteristic value for the uplink-downlink configuration and the parameter value of the first desired uplink-downlink configuration in a preceding uplink-downlink configuration definition; and
obtaining a priority factors of the neighboring cell, and
the processor defines the uplink-downlink configuration based on the priority factors of the subject cell and the neighboring cell.

5. The apparatus according to claim 4, wherein the processor is configured to issue the priority factor of the subject cell to the neighboring cell in an exchange time window within a TDD configuration period.

6. The apparatus according to claim 5, wherein
the processor is configured to obtain an indication for defining the exchange time window from a base station of a superordinate cell of the cellular communication system, the cells of the cell cluster being associated with the superordinate cell, and/or
the exchange time window has a specified duration starting at a specified offset from the start of the TDD configuration period and ending prior to the end of the TDD configuration period.

7. The apparatus according to claim 4, wherein
the processor is further configured to discriminate between
a first configuration mode, in which a same uplink-downlink configuration is required for the cell cluster, and
a second configuration mode, in which different uplink-downlink configurations within a same subset of uplink-downlink configurations are allowed for the cell cluster,
in the first configuration mode, the uplink-downlink configuration is defined for all cells of the cell cluster based on priority factors of the subject cell and the neighboring cell, and
in the second configuration mode, the uplink-downlink configuration is defined for the subject cell of the cell cluster based on subsets of the set of predefined uplink-downlink configurations.

8. The apparatus according to claim 7, wherein
the processor is configured to obtain an indication of a configuration mode for defining the uplink-downlink configuration for the subject cell from a base station of a superordinate cell of the cellular communication system, and
the cells of the cell cluster are associated with the superordinate cell.

9. The apparatus according to claim 1, wherein the processor is configured to:
  issue the first desired uplink-downlink configuration to the neighboring cell; and
  obtain the second desired uplink-downlink configuration from the neighboring cell in an exchange time window within a TDD configuration period.

10. The apparatus according to claim 1, wherein
the processor is configured to issue the first defined uplink-downlink configuration for TDD communication in the subject cell to the neighboring cell and a base station of a superordinate cell of the cellular communication system, and
the cells of the cell cluster are associated with the superordinate cell.

11. The apparatus according to claim 1, wherein
the processor is configured to define the uplink-downlink configuration once per TDD configuration period, and/or
the first desired uplink-downlink configurations and the second desired uplink-downlink configuration refer to desired uplink-downlink configurations in a subsequent TDD configuration period, and/or
the processor is configured to define the uplink-downlink configuration upon detection of at least one configuration request in the cell cluster.

12. The apparatus according to claim 1, wherein
the apparatus is operable as or at a base station or of the cellular communication system, and/or
the apparatus is operable in the subject cell, and/or
the cellular communication system comprises a long term evolution and/or long term evolution advanced system, and/or
the cellular communication system comprises a layered heterogeneous network deployment, wherein the subject cell and the neighboring cell represent a micro, pico or femto cell.

13. A method, comprising:
defining, for a subject cell of a cellular communication system, an uplink-downlink configuration for time division duplex (TDD) communication out of a set of predefined uplink-downlink configurations with flexible subframe patterns for flexible TDD communication, wherein
the defining is based on a first desired uplink-downlink configuration in the subject cell, and a second desired uplink-downlink configuration in a neighboring cell of the cellular communication system, the neighboring cell and the subject cell belonging to a same cell cluster of the cellular communication system, and
the defining includes:
  calculating a characteristic value based on parameter values of the first desired uplink-downlink configuration and the second desired uplink-downlink configuration; and
  selecting, from the set of predefined uplink-downlink configurations, a particular uplink-downlink configuration that has a parameter value closest to the calculated characteristic value, as the uplink-downlink configuration for the subject cell.

14. The method according to claim 13, wherein a parameter value of the first desired uplink-downlink configuration is a ratio of a number of downlink subframes to a number of uplink subframes in the first desired uplink-downlink configuration.

15. The method according to claim 13, wherein the characteristic value is an average of the parameter values of the first desired uplink-downlink configuration and the second desired uplink-downlink configuration.

16. The method according to claim 13, further comprising:
identifying priority factors of the subject cell and the neighboring cell by:
  determining a priority factor of the subject cell based on at least one of a location of the subject cell with respect to an edge of the cell cluster and a difference between the characteristic value for the uplink-downlink configuration and the parameter value of the first desired uplink-downlink configuration in a preceding uplink-downlink configuration definition; and
  obtaining a priority factors of the neighboring cell, wherein
the defining the uplink-downlink configuration is based on the priority factors of the subject cell and the neighboring cell.

17. The method according to claim 16, further comprising:
issuing the priority factor of the subject cell to the neighboring cell in an exchange time window within a TDD configuration period.

18. The method according to claim 17, further comprising:
obtaining an indication for defining the exchange time window from a base station of a superordinate cell of the cellular communication system, the cells of the cell cluster being associated with the superordinate cell, wherein
the exchange time window has a specified duration starting at a specified offset from the start of the TDD configuration period and ending prior to the end of the TDD configuration period.

19. The method according to claim 16, further comprising:
discriminating between a first configuration mode, in which a same uplink-downlink configuration is required for the cell cluster, and a second configuration mode, in which different uplink-downlink configurations within a same subset of uplink-downlink configurations are allowed for the cell cluster, wherein
in the first configuration mode, the uplink-downlink configuration is defined for all cells of the cell cluster based on priority factors of the subject cell and the neighboring cell, and
in the second configuration mode, the uplink-downlink configuration is defined for the subject cell of the cell cluster based on subsets of the set of predefined uplink-downlink configurations.

20. An apparatus, comprising:
a memory; and
a processor configured to define, for a subject cell of a cellular communication system, an uplink-downlink configuration for time division duplex (TDD) communication out of a set of predefined uplink-downlink configurations with flexible subframe patterns for flexible TDD communication, wherein
the processor defines the uplink-downlink configuration based on:
  a first desired uplink-downlink configuration in the subject cell,
  a second desired uplink-downlink configuration in a neighboring cell of the cellular communication system, the neighboring cell and the subject cell belonging to a same cell cluster of the cellular communication system, and subsets of the set of predefined uplink-downlink configurations, wherein to define the uplink-downlink configuration, the processor is configured to:

select one subset of uplink-downlink configurations, out of a number of preconfigured subsets of uplink-downlink configurations, based on the first desired uplink-downlink configuration and the second uplink-downlink configuration, and select, from the selected one subset of uplink-downlink configurations, a particular uplink-downlink configuration that is closest to the first uplink-downlink configuration, as the uplink-downlink configuration for the subject cell.

* * * * *